Figure 1:
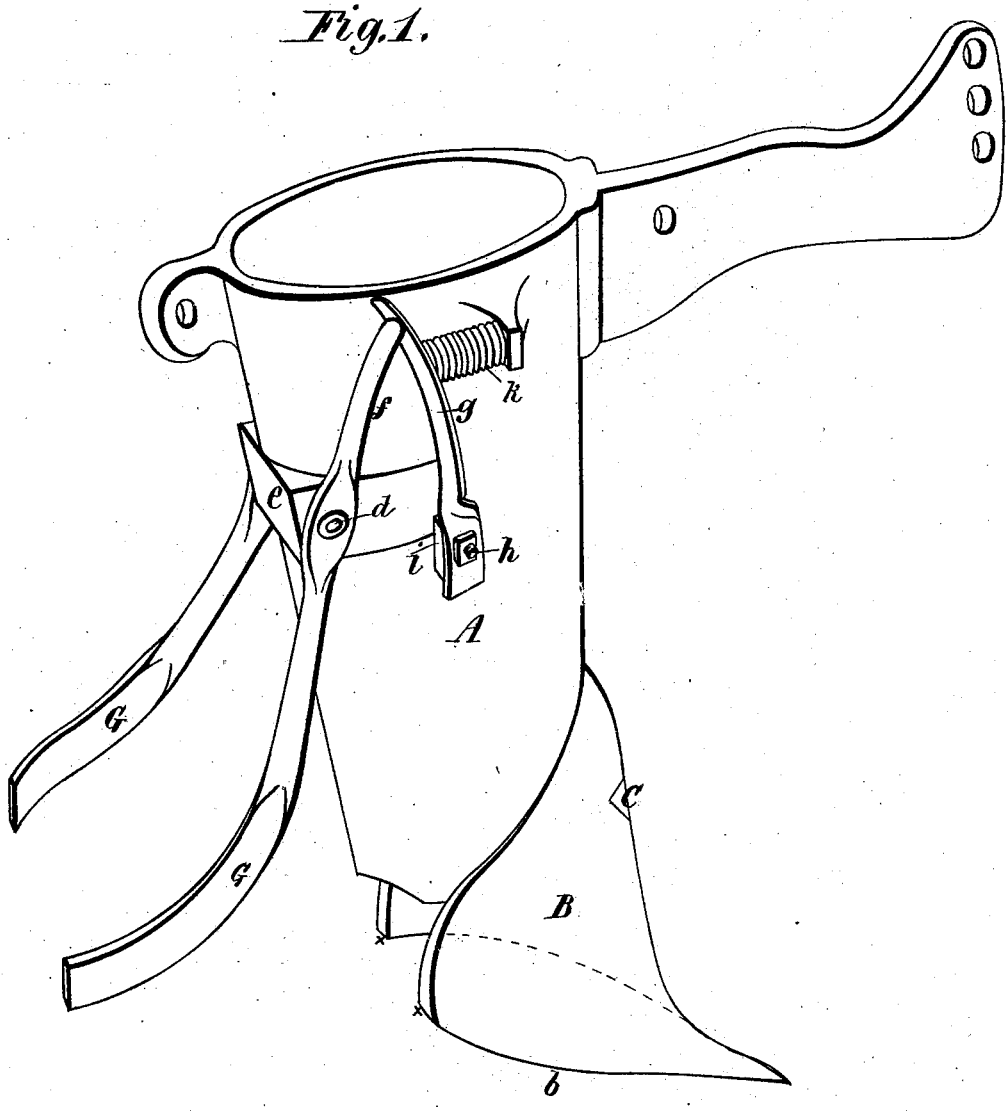

(No Model.) 2 Sheets—Sheet 1.

J. H. PURDY & C. T. WELCH.
SEED DRILL.

No. 293,671. Patented Feb. 19, 1884.

Attest.
B. C. Fenwick.
Robt. L. Fenwick.

Inventor.
James H. Purdy
Charles T. Welch
by his atty
Fenwick and Lawrence (No Model.) 2 Sheets—Sheet 2.
J. H. PURDY & C. T. WELCH.
SEED DRILL.
No. 293,671. Patented Feb. 19, 1884.
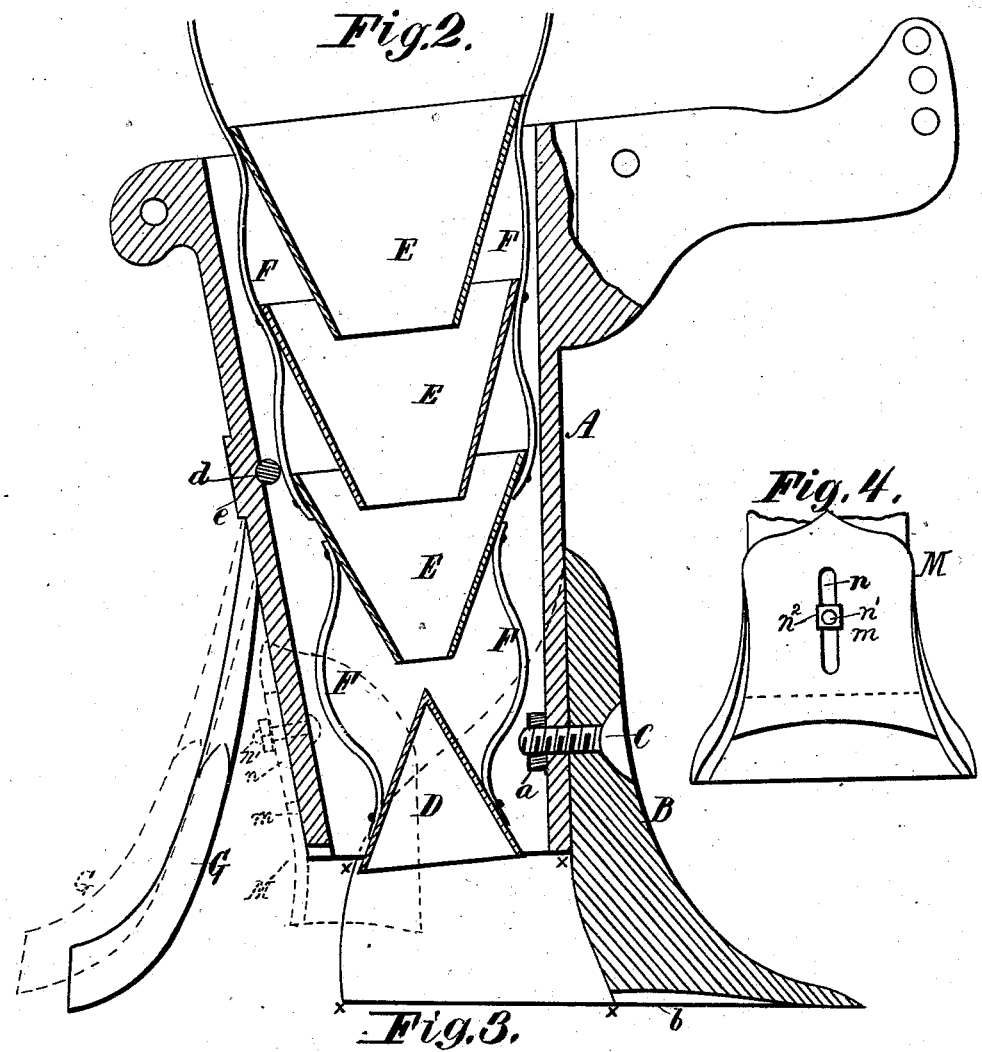
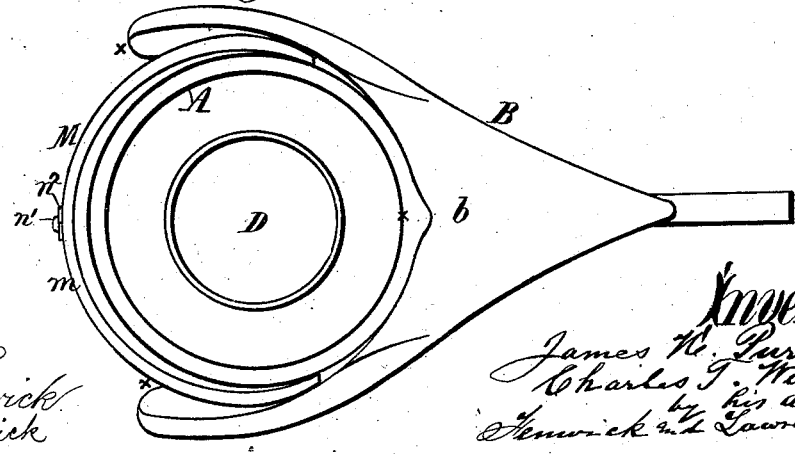

UNITED STATES PATENT OFFICE.

JAMES H. PURDY AND CHARLES T. WELCH, OF BELLONA, NEW YORK.

SEED-DRILL.

SPECIFICATION forming part of Letters Patent No. 293,671, dated February 19, 1884.

Application filed September 19, 1883. (No model.)

*To all whom it may concern:*

Be it known that we, JAMES H. PURDY and CHARLES T. WELCH, citizens of the United States, residing at Bellona, in the county of Yates and State of New York, have invented a new and useful Improvement in Seed-Drills, of which the following, taken in connection with the annexed drawings and letters of reference thereon, is a specification.

This invention is an improvement upon the seed-drill filed by us in the United States Patent Office on the 20th day of February, 1883, and for which a patent was allowed April 26, same year.

The present invention consists, first, in the combination of a drill-tooth, terminated at its lower end all around a considerable distance above the surface of the ground into which the seed is to be deposited, with a scatterer of conical form, also terminated a nearly corresponding distance from the ground, and with a broad-based low plow, having rearwardly-extended sloping wings, which form right and left mold-boards, as will be presently described; second, in the combination of a series of inverted truncated conical seed-conductors, united together by flexible straps, and arranged to telescope upon one another, with the drill-tooth and the conical scatterer, as will be hereinafter described; third, in the construction of the covering devices upon the drill-tooth, in the manner hereinafter described; and, fourth, in a guard on the tooth.

In the accompanying drawings, Figure 1 is a perspective view of a drill-tooth constructed in accordance with our invention, the conducting-tube and scatterer not being shown within it. Fig. 2 is a vertical longitudinal section of the same, with the conducting-tube and scatterer applied within the tooth. The dotted lines show a coverer in its working position. Fig. 3 is an inverted or bottom view of Fig. 2, the covering devices not being shown; and Fig. 4 is a broken rear elevation of the tooth, showing an adjustable guard for preventing the seed scattering too much while sowing shallow, applied to the tooth at a point between the side covering devices, as illustrated by dotted lines in Fig. 2 and full lines in Fig. 3.

A in the views of the drawings designates the tubular part of the drill-tooth; B, the low plow applied to the lower end of the tooth, and C a strong fastening-bolt with nut $a$, by which the plow and part A of the tooth are firmly bolted together. The front central portion of the plow is of V form, and sharp, so as not to carry earth, and made strong and durable, so as to afford sufficient support for the fastening-bolt, as shown. The wings or sloping sides of the plow are comparatively light and thin, and they spread apart, so as to fit nearly around the tubular portion A, and extend back to near the rear of said portion A, as shown in the drawings. The tubular portion A is terminated at its lower end a considerable distance above the sole $b$ of the plow, so as to not occupy the space either at front, rear, or sides, which is designated by the letters $x\ x\ x\ x$, and by thus constructing and applying the tubular portion a great advantage is secured.

In planting wheat and other seed, it is found very beneficial to spread the same over a broad surface, instead of planting it in a "heap" with the grains lying close to one another. To accomplish this spreading of the seed at all points around or over the space $x\ x\ x\ x$, the front portion of the extremity of the tubular portion A, as well as all other portions of said extremity, must be cut away, as illustrated in the drawings. Thus cutting off the tubular portion A, and forming the large space $x\ x\ x\ x$ below said portion A, allows greater freedom and affords more room for the lateral, forward, and backward spreading of the seed below the said portion A. In other drill-teeth, where a low plow is applied to their extremities, it has been customary to extend the front portion of the lower extremity down to near the sole of the plow, and by this construction a portion of the space $x\ x\ x\ x$ is occupied, and the seed is prevented from spreading to the desired extent. Our construction obviates this difficulty and greatly improves the drill-tooth.

In our allowed application hereinbefore referred to, a rubber flexible tube for conducting the seed to the conical scatterer D is employed, and while this conducting-tube answers a very important purpose, it is found that an improved result can be secured by constructing the said flexible tube of a series of inverted truncated hollow cones, E E E, and connecting these cones and the scatterer D by means of flexible straps F F, as shown. The series of truncated cones are suspended, with the scatterer, within the drill-tooth by means of the said straps, which are to be fastened by their upper ends to the appropriate part of the seed-drilling machine, as is usual with other conducting-tubes. The scatterer D is arranged to stand in about the relation to the lowest cone and the extremity of the tubular portion A of the drill-tooth represented in the drawings. When the drill-tooth is raised out of the ground, or a considerable distance above the same, the flexible straps F fold or yield and allow the scatterer and the cones to telescope into one another, and thus the conducting-tube and scatterer do not offer any obstruction to the elevation of the drill-tooth. A soon as the drill-tooth is lowered for operation, the scatterer and cones of the conducting-tube descend to their proper working positions.

The drill-tooth described is provided on each side with a vibrating pivoted spring-coverer, G. These coverers are pivoted at $d$ to a projection, $e$, of the drill-tooth, and their lever ends $f$ bear against spring-stops $g$, which are bolted firmly, as at $h$, to lugs $i$ of the said tooth. The stops $g$ are yielding beyond their point of attachment, and they serve for keeping the coverers down to their work, and also allowing them to pass over formidable obstructions.

We propose to use the spring-stops without a secondary or relief spring, such as is designated by the letter $k$; but it may in some constructions be very desirable to provide the abutment spiral spring $k$, and thus save the spring-stop $g$ from too great labor. We also propose to employ the spiral spring $k$ without the spring-stop $g$, and in such construction the lever end $f$ of the coverer would be connected directly to the rear end of the spiral spring.

In Figs. 2, 3, and 4 of the drawings is shown a regulation-guard, M, placed upon the rear lower portion of the drill-tooth in the manner illustrated in Fig. 2 by dotted lines, and in Fig. 3 by full lines. This device consists of a broad curved plate, $m$, partly encircling the said tooth, as shown, and provided with an adjusting-slot, $n$, through which a fastening-bolt, $n'$, with nut $n^2$, is passed. The bolt may be secured in the metal of the tooth, and on its screw-threaded end the nut is secured after the plate is adjusted in position upon the bolt, as shown. This device M can be adjusted up or down, to suit different depths of planting the grain, and it serves as a guard for preventing the scattering of the grain to too great an extent in shallow planting, while in deep planting it can be moved up out of the way. While planting deep, the sliding plate is moved up, and while planting shallow it is moved down. Any desired extent of adjustment can be made. The drill-tooth may be constructed without this guard, as illustrated in Fig. 1.

We have found by using the broad bottomed or surfaced drill-teeth, and scattering the seed over a broad level bed of earth, and covering the same with the devices described, that a very much greater yield or crop from a given amount of seed-grain can be realized than when the ordinary form of drill-tooth is adopted.

It will be seen, as shown in Fig. 1, that the spring-stop $g$ and the actuating coil-spring $k$, when such spring is employed, are applied to the upper end of the tooth A, and so the coil-spring when used is not liable to have its action affected by earth and small stones getting between the coils during the act of drilling the grain, as is the case when the coil-spring is applied to the tooth near the ground or below the longitudinal center of the tooth; and in case the yielding or spring stops $g$ are employed, either with or without the coil-spring $k$, it will be seen that the normal contact of the lever ends $f$ of the coverers G always impinge against the yielding or spring stops $g$ at their upper ends and far away from any liability to become interfered with by earth and small stones during the act of drilling, while at the same time the vertical or nearly vertical position of the spring-stops $g$ renders a clogging action due to the earth when in use almost an impossibility.

What we claim as our invention, and desire to secure by Letters Patent, is—

A seed-drill tooth which comprises in its construction a series of hollow inverted truncated cones, E, a conical scatterer, D, suspended beneath the lowermost cone of the series, an adjustable guard, M, for preventing too great scattering of the grain during shallow plowing, and vibrating coverers G, substantially as described.

JAMES H. PURDY.
CHARLES T. WELCH.

Witnesses:
A. W. BAINE,
FRANK HARFORD.